United States Patent [19]

von Zander

[11] 4,287,160
[45] Sep. 1, 1981

[54] PROCESS AND SHAFT KILN FOR THE BURNING OF LIME OR SIMILAR BULK MATERIALS

[75] Inventor: Hans von Zander, Balduinstein, Fed. Rep. of Germany

[73] Assignee: Johann Schaefer Kalkwerke, Diez, Fed. Rep. of Germany

[21] Appl. No.: 65,208

[22] Filed: Aug. 9, 1979

[30] Foreign Application Priority Data

Aug. 9, 1978 [DE] Fed. Rep. of Germany ....... 2834862

[51] Int. Cl.³ .............................................. C01F 1/00
[52] U.S. Cl. ................................... 423/168; 423/175; 423/637; 106/100; 432/99
[58] Field of Search ................... 432/14, 96, 99, 100, 432/101, 95; 423/168, 175, 177, 637; 106/100

[56] References Cited

U.S. PATENT DOCUMENTS

| | | | |
|---|---|---|---|
| 1,804,362 | 5/1931 | Martin | 432/100 |
| 1,912,621 | 6/1933 | Clark | 432/100 |
| 2,742,276 | 4/1956 | Azbe | 432/100 |
| 3,917,795 | 11/1975 | Pelczanski et al. | 423/168 |
| 3,941,557 | 3/1976 | Buchner | 432/99 |

FOREIGN PATENT DOCUMENTS

211048 2/1960 Austria .
1109080 6/1961 Fed. Rep. of Germany .
1157133 11/1963 Fed. Rep. of Germany .
1205884 11/1965 Fed. Rep. of Germany .

*Primary Examiner*—Henry C. Yuen
*Attorney, Agent, or Firm*—Fisher, Christen & Sabol

[57] ABSTRACT

Process for the burning of lime, cement or other lumpy bulk materials in a shaft kiln using coal. Coal dust or particulated dry coal is continuously fed into a gasification chamber positioned in the center of the shaft kiln and is therein partially or fully gasified by the addition of air in substoichiometric proportions. The partially or fully gasified fuel is mixed with air at an elevated temperature. Such mixture is then burned in the burning zone of the shaft kiln. The flow of the heating medium, i.e., the burnt fuel, and the flow of the kiln charge are co-current within the kiln. The shaft kiln has a centrally postioned gasification chamber which is mounted on radial supports which are positioned in the shaft kiln in such a way as to produce a space below the supports. The space is substantially free from kiln charge. Uniform distribution of the gases is guaranteed across the cross section of the shaft kiln by the space.

4 Claims, 2 Drawing Figures

PROCESS AND SHAFT KILN FOR THE BURNING OF LIME OR SIMILAR BULK MATERIALS

BACKGROUND OF THIS INVENTION

Field of this Invention

This invention relates to a process and correspondingly designed shaft kilns for the burning of lime, cement or other lumpy bulk materials using coal.

Numerous processes are known in which fuel oil in a fully or partly gasified state or gas is introduced peripherally into a shaft kiln. In addition, kilns have been built that were designed to feed in the fuel—usually gas—centrally from below with the cooling air. These are mainly shaft kilns in which the flow of the kiln charge and the gas are completely or partly countercurrent during the burning process. In this type of kiln the quantity of fuel fed in centrally at the lower end of the shaft is limited by the fact that premature ignition must be avoided in order to prevent hot kiln charge from being discharged. The disadvantage of peripheral fuel feed is that, especially where the cross section of the shaft is large, the penetration depth into the bulk material is unsatisfactory.

Rotary kilns heated by coal dust are also well known. However, the thermal efficiency of this type of kiln is so low that shaft kilns should be used wherever possible. One possibility is the Schmid-Hofer co-current/countercurrent regenerative system (Austrian Patent No. 211,048 and West German Patent (DBP) No. 1,157,133). In such system, two or three shafts are switched alternately to co- and countercurrent, and fuel (gas or fuel oil) is fed only to the respective co-current shaft. The cooling zone is only supplied with air.

At present about 160 kiln systems operate according to such principle. However, they now all run on mineral fuels (oil or gas), of which the price has increased fourfold in recent years. Furthermore, since both supplies and prices of mineral fuels are subject to numerous political influences, further drastic increase can be expected in the next few years.

Another known shaft kiln for the burning of cement, lime and similar materials has a central combustion chamber located at the upper end of the shaft. Such chamber produces heating gases that are no longer combustible as the only source of heat for the burning process [See West German Application (AS) No. 1,205,884 and West German Patent (DBP) No. 1,109,080.]Such type of shaft kiln is intended for use mainly with liquid or gaseous fuels or completely gasified solid fuels.

BROAD DESCRIPTION OF THIS INVENTION

The aim of this invention was therefore to develop an economic process for the burning of lime or similar bulk materials in which lignite or hard coal can be used instead of the mineral fuel. This is an advantage not only because the process is independent of oil and natural gas, but also because the cost of heat produced by coal dust and dry coal is already substantially lower than the cost of heat generated by mineral fuels. Even if the price of both coal and mineral fuels should increase, it is still expected that there will still be a substantial gap between the costs of heating using coal as opposed to mineral fuels.

It has been found that this can be achieved in a technically advanced way: by continuously feeding coal dust or dry coal, i.e., lignite or other coal having a particle size of less than 5 mm, into a centrally positioned gasification chamber for the burning of lime or similar bulk material, and by fully or partially gasifying the coal dust or dry coal therein by the addition of air in substoichiometric proportions, and then mixing the fully or partially gasified fuel with air at an elevated temperature and burning the mixture in the adjoining burning zone of the shaft kiln; and using co-current (as opposed to countercurrent) flows of the heating medium, i.e., the burnt fuel, and of the kiln charge.

According to a favourable embodiment of this invention, the quantity of coal dust or dry coal required per kiln charge is weighed out prior to the beginning of the burning time and is continuously fed into the gasification chamber during the burning period. Air of optimum temperature can be diverted from the preheating zone of the shaft kiln and fed into the gasification chamber as the gasification air.

For conducting the process according to this invention, a shaft kiln may be used that has a central gasification chamber which is mounted in the shaft kiln on supports in such a way as to produce a space below the supports that is largely free from kiln charge. This space guarantees the uniform distribution of the gases over the total cross section of the shaft kiln.

It has proved useful to install an eccentrically rotatable distributing cone at the entrance to the preheating zone; the cone is controlled by a number of probes and keeps the kiln charge level even.

In a further embodiment of the shaft kiln according to this invention, extraction channels are provided for drawing off the gasification air from the preheating zone, and two fans are inserted into these channels, preferably opposite to each other. Finally, it is often useful to insert a double coil at the entrance to the gasification chamber in order to improve the distribution of air within the gasification chamber.

DETAILED DESCRIPTION OF THIS INVENTION

Figure 1:
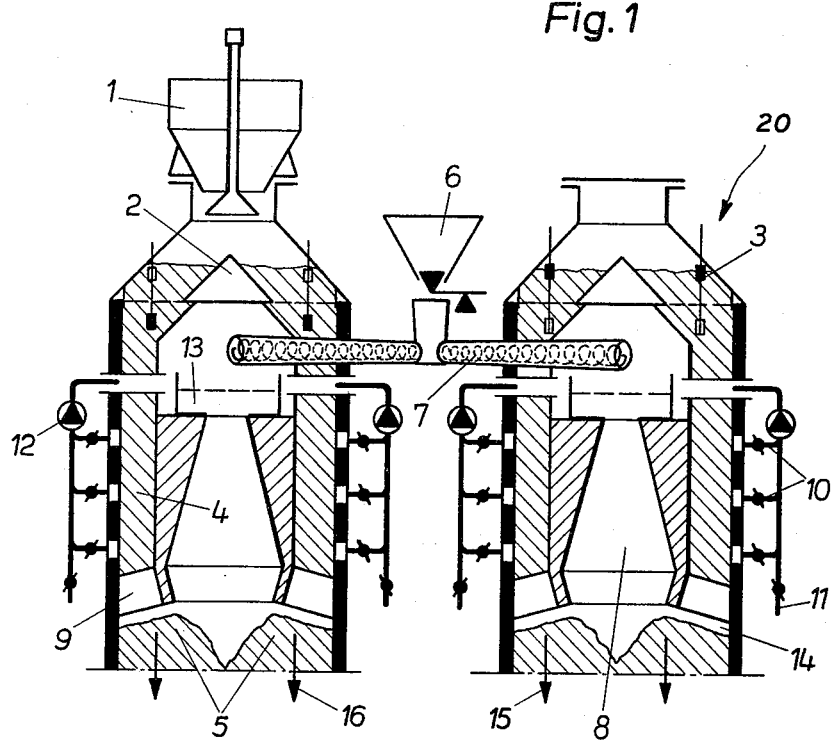

Further features, advantages and possible applications of this invention are shown by and can easily be derived from the following description of further details (with reference to the drawings).

In the drawing

Figure 2:
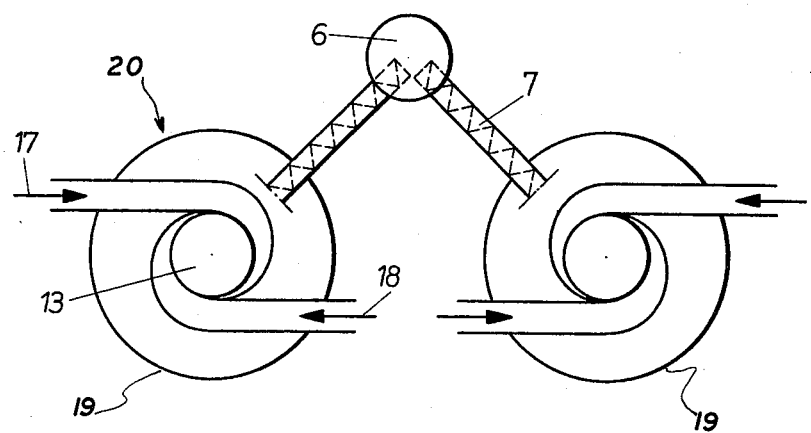

FIG. 1 is a simplified schematic sectional front view of the preheating zone of a twin-shaft co-current/countercurrent regenerative kiln; and FIG. 2 is a simplified schematic sectional top of the double coil at the entrance to the gasification chamber of the kiln of FIG. 1.

In the arrangement shown in FIG. 1, the raw material to be burned, e.g. lumpy lime, is fed into the throat of the kiln 20 using a charging bin 1 and is evenly distributed over the cross section of the kiln in the preheating zone 4 by the distributing cone 2. The position of the distributing cone 2, which rotates about an eccentric axis, is controlled by a number of probes 3.

In the embodiment of this invention shown in this figure, the quantity of coal dust or dry coal required per kiln charge is weighed out in the weighing bin 6 and is then fed during the burning period continuously to the particular gasification chamber 8 that is in operation, by means of the screw conveyors 7. A single weighing device is sufficient for two or three shafts if the conveying elements, in this case the screw conveyors 7, can be switched to the appropriate shaft 19.

In the case under consideration, the gasification air is either extracted from the preheating zone 4 at a specific temperature by the fans 12 via the extraction channels 10 or is fed directly to the appropriate gasification chamber 8 via the fresh air inlets 11. Partial or complete gasification of the fuel occurs in the gasification chamber 8, and the products enter the burning zone 5 directly or via the space 14 below the supports 9 which hold the gasification chamber 8 in its central position in the shaft 19. Final burning then occurs with the air preheated to a high temperature coming from the preheating zone 4. As symbolized by the arrows 16, the flows of the kiln charge 15 and the heating medium, i.e. the burnt fuel, within the shaft kiln 20 are co-current.

FIG. 2 shows the top view of the double coil 13, which was only implied in FIG. 1 and which produces a substantial improvement in the air distribution in the gasification chamber 8. The direction of air inlet into the double coil 13 is indicated in FIG. 2 by the arrows 17 and 18.

The central position of the gasification chamber 8 in the shaft kiln 20 according to this invention is an arrangement based on the Dr. Schoppe system. An alternative arrangement would be to locate a coal dust distributer at the lower end of the preheating zone 4 to feed a certain quantity of the fully or partial gasified coal dust, preferably lignite dust, or dry coal into the burning zone 5 during the burning period. Final burning then is effected by means of the air that enters the burning zone 5 via the preheating zone 4 surrounding the gasification chamber 8.

The supports 9 for the horizontal location of the gasification or coal dust distribution device (cf. FIG. 1) are made of refractory material. Their dimensions and position are such that they ensure uniform distribution of the fuel over the cross section of the kiln 20 by means of the space that is thus produced below them.

Even if the kiln charge, e.g. the burnt lime produced, should be polluted in specific cases by coal ash, the product would still satisfactory for many applications. As the following considerations on lignite dust show, the secondary minerals content entering the lime from the coal dust is irrelevant for the majority of applications.

If it is assumed that 3,770 kJ is required in a co-current/countercurrent regenerative kiln to burn one kilogram of kiln charge lime containing about 96.5 percent CaO, then about 0.176 kg of lignite dust with a calorific value of 21,370 kJ/kg will be used per kg of lime. Since the ash content of lignite dust is about 4 percent, $0.176 \times 0.04 = 0.007$ kg or 0.7 percent ash enters the lime. Analysis of the ash reveals a lime content of about 50 percent, therefore about 0.35 percent secondary minerals enter the lime. Experience has shown that this value falls to about one third if the lime is sieved down to a grain size of about 3 or 5 mm.

The situation is similar in the case of sulphur: in lignite dust from the Rhine area in particular the ratio of the sulphur content to the heat content is lower than in the fuel oil of this type "max 1% S".

Depending on the particular properties of the coal dust used, it may be advisable to operate the gasifier on fresh air or air that has been preheated to a certain extent. This is why the extraction channels 10 are positioned in various horizontal planes in the preheating zone 4 of the shaft kiln 20 described earlier, these channels being able to be switched on as required by means of a temperature control (also implied in FIG. 1).

In the case of large kiln units it is useful to provide two extraction fans 12 to ensure uniform extraction of the gasification air, and to fit double couls 13 to the entrance of the gasification chambers 8 as already described.

Components that are not expressly described in the explanation of the invention or shown in the figures are conventional components with which the expert will already be acquainted.

I claim:

1. Process for the burning of lime, cement or another similarly burnable lumpy bulk material in a shaft kiln using coal, which comprises continuously feeding coal dust or dry coal into a gasification chamber positioned in the center of the shaft kiln, partially or fully gasifying the coal dust or dry coal therein by the addition of air in substoichiochiometric proportions, mixing the resultant partially or fully gasified fuel with air at an elevated temperature, and then burning the mixture in the burning zone of the shaft kiln, the flow of the burnt fuel, that is, heating medium, and the flow of the kiln charge being cocurrent within the kiln.

2. The process as claimed in claim 1 which includes weighing out the quantity of coal dust or dry coal required per kiln charge before the burning time begins and continuously feeding such quantity of coal dust or dry coal into the gasification chamber during the burning period.

3. The process as claimed in claim 1 or claim 2 which includes diverting air of optimum temperature from the preheating zone of the shaft kiln and feeding such air into the gasification chamber as gasification air for the partial or complete gasification of the fuel.

4. The process as claimed in claim 3 wherein the coal dust or dry particulated coal has a particle size of less than 5 mm.

* * * * *